US010566772B2

(12) United States Patent
Ledbetter et al.

(10) Patent No.: US 10,566,772 B2
(45) Date of Patent: Feb. 18, 2020

(54) DRIVE UNIT FOR CIRCUIT BREAKERS, SWITCHGEAR, AND MOTOR CONTROL CENTERS

(71) Applicant: CBS ArcSafe, Inc., Denton, TX (US)

(72) Inventors: Finley Lee Ledbetter, Argyle, TX (US); David Walterscheid, Argyle, TX (US); Jonathan Whitney, Denton, TX (US); Ashley Ledbetter McWhorter, Argyle, TX (US)

(73) Assignee: CBS ArcSafe, Inc., Denton, TX (US)

( * ) Notice: Subject to any disclaimer, the term of this patent is extended or adjusted under 35 U.S.C. 154(b) by 0 days.

(21) Appl. No.: 15/805,873

(22) Filed: Nov. 7, 2017

(65) Prior Publication Data

US 2018/0131164 A1 May 10, 2018

Related U.S. Application Data

(60) Provisional application No. 62/419,748, filed on Nov. 9, 2016.

(51) Int. Cl.
*B23P 19/00* (2006.01)
*H02B 11/127* (2006.01)
*H02B 3/00* (2006.01)
*H02P 8/34* (2006.01)

(52) U.S. Cl.
CPC ............. *H02B 11/127* (2013.01); *H02B 3/00* (2013.01); *H02P 8/34* (2013.01); *Y10T 29/53248* (2015.01)

(58) Field of Classification Search
CPC .... H02B 11/127; H02B 3/00; H05B 33/0884; Y10T 29/53248

USPC ......... 29/756, 418, 428, 469, 622, 762, 764, 29/876; 200/50.21, 50.24, 50.26, 200, 200/296

See application file for complete search history.

(56) References Cited

U.S. PATENT DOCUMENTS

| | | | | |
|---|---|---|---|---|
| 7,825,344 B2 * | 11/2010 | Stevenson | ............ | H02B 11/127 200/50.21 |
| 8,319,123 B2 | 11/2012 | Faulkner et al. | | |
| 8,395,065 B2 | 3/2013 | Zylstra et al. | | |
| 8,456,259 B2 | 6/2013 | Safreed, III et al. | | |
| 8,553,394 B2 * | 10/2013 | Hawkins | ............... | H02B 11/127 200/50.24 |

(Continued)

OTHER PUBLICATIONS

International Search Report and Written Opinion dated Jan. 16, 2018 in International Application No. PCT/US2017/060393, 10 pages.

*Primary Examiner* — Thiem D Phan
(74) *Attorney, Agent, or Firm* — Foley & Lardner LLP

(57) ABSTRACT

Disclosed herein is a drive unit for driving a tool mated with a tool receptacle in a device. The drive unit includes a tool carrying apparatus configured to carry the tool, and a proximity sensor cooperating with at least a portion of the tool carrying apparatus so as to detect movement of the tool carrying apparatus along a longitudinal axis thereof. A motor apparatus is configured to rotate the tool carrying apparatus. Control circuitry is configured to operate the motor in an engagement mode to rotate at least a portion of the tool carrying apparatus until the tool is rotationally aligned with the tool receptacle so as to permit insertion thereinto, based on the proximity sensor not detecting movement of the tool carrying apparatus a threshold distance along the longitudinal axis toward the tool receptacle.

15 Claims, 19 Drawing Sheets

(56) References Cited

U.S. PATENT DOCUMENTS

2013/0231779 A1 9/2013 Purkayastha et al.
2015/0114807 A1 4/2015 Benke et al.
2016/0181770 A1 6/2016 Ledbetter

* cited by examiner

US 10,566,772 B2

DRIVE UNIT FOR CIRCUIT BREAKERS, SWITCHGEAR, AND MOTOR CONTROL CENTERS

CROSS REFERENCE TO RELATED APPLICATIONS

This application claims the benefit of and priority to U.S. Provisional Patent Application No. 62/419,748 filed on Nov. 9, 2016, which is incorporated herein by reference in its entirety.

TECHNICAL FIELD

This disclosure generally relates to a remote racking tool for use with circuit breakers and switchgears.

BACKGROUND

Locations such as industrial plants, refineries, offshore oil platforms, hotels, and hospitals employ multiple circuit breakers, typically located within a circuit breaker cabinet. The installation and removal of circuit breaker involves the engagement or disengagement of contacts of the circuit breaker with a power bus within the circuit breaker cabinet. Conventionally, this installation and removal is performed manually by a technician.

Manual installation and removal, however, may be undesirable for a variety of reasons. For example, when the contacts of the circuit breaker are engaged or disengaged with the power bus, an arc-flash may occur. This arc-flash is a rapid release of energy and can damage the circuit breaker, the circuit breaker cabinet, or other circuit breakers.

Thus, technology has been developed that reduces the possibility of an arc-flash. While this technology has been relatively successful, it may still involve the manual insertion of a tool into an apparatus within the circuit breaker, and the manual turning of that tool by a technician.

While the possibility of arc-flash is reduced by this technology, possibility of arc-flash still remains. Therefore, it is desirable for the manual actuation by a technician to be replaced by automated remote actuation.

However, numerous examples of reliable manually operated technology that reduces the possibility of an arc-flash are installed in locations, or in production, and it may be undesirable to replace or redesign such technology. Therefore, further design of devices that enable previously manually operated circuit breakers to be remotely actuated in an automated fashion, without a redesign of such manually operated circuit breakers, is desirable.

DETAILED DESCRIPTION

The present description is made with reference to the accompanying drawings, in which example embodiments are shown. However, many different embodiments may be used, and thus the description should not be construed as limited to the embodiments set forth herein. Rather, these embodiments are provided so that this disclosure will be thorough and complete. Like numbers refer to like elements throughout.

Figure 1:
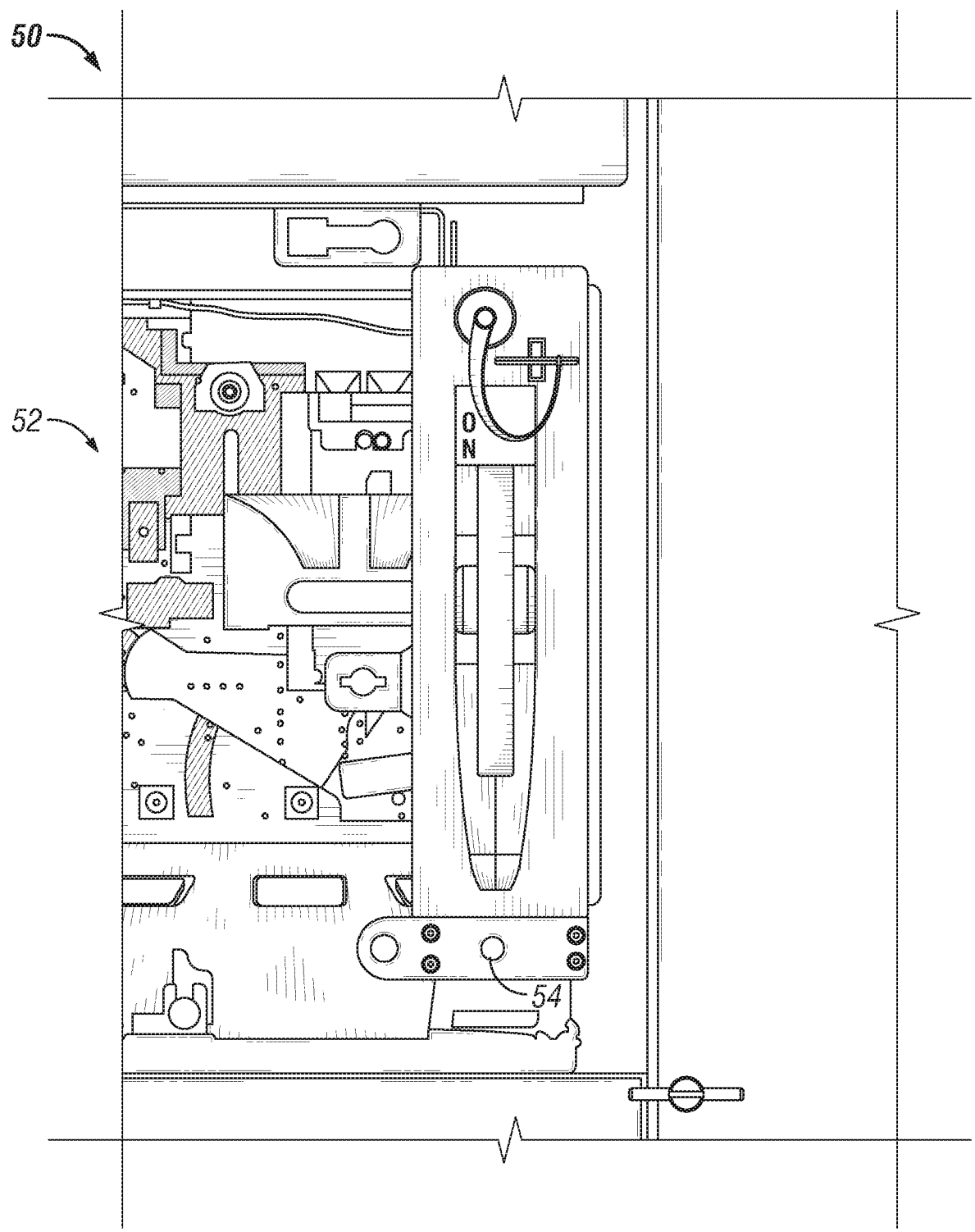
FIG. 1 is a front view of a circuit breaker box with a circuit breaker inserted therein.
Figure 2:
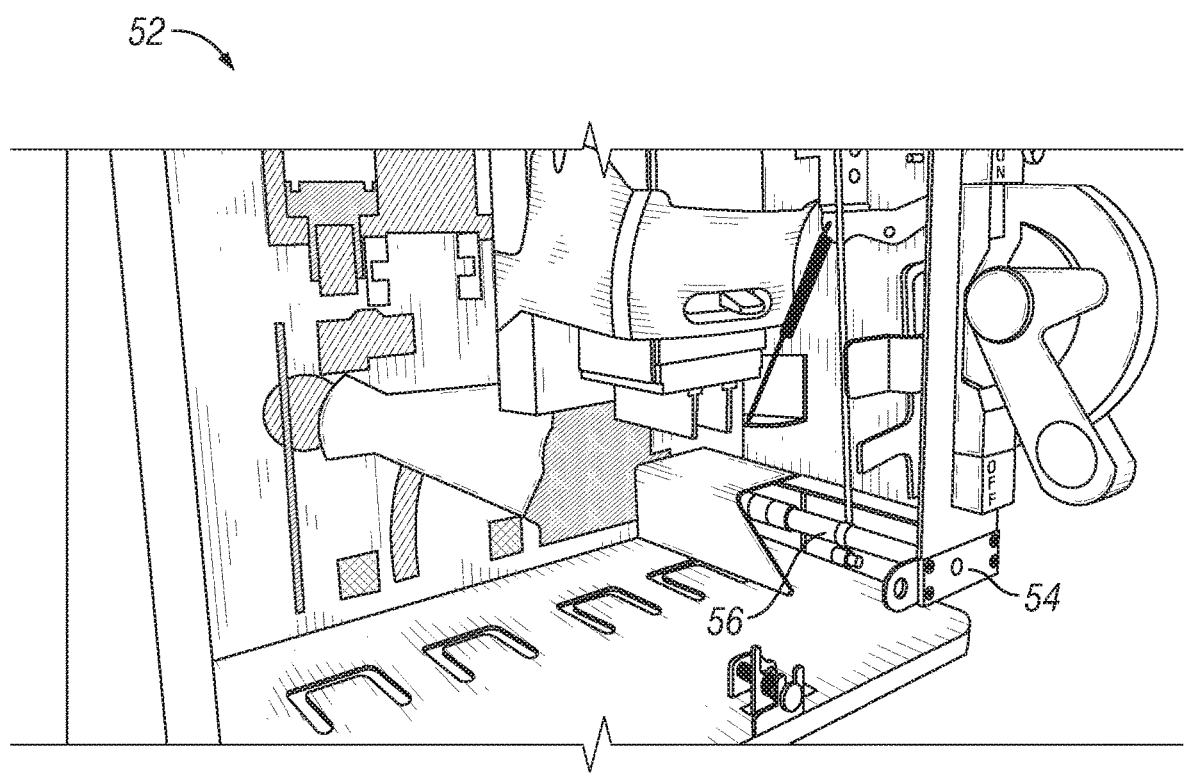
FIG. 2 is a perspective view of the circuit breaker box of FIG. 1.
Figure 3:
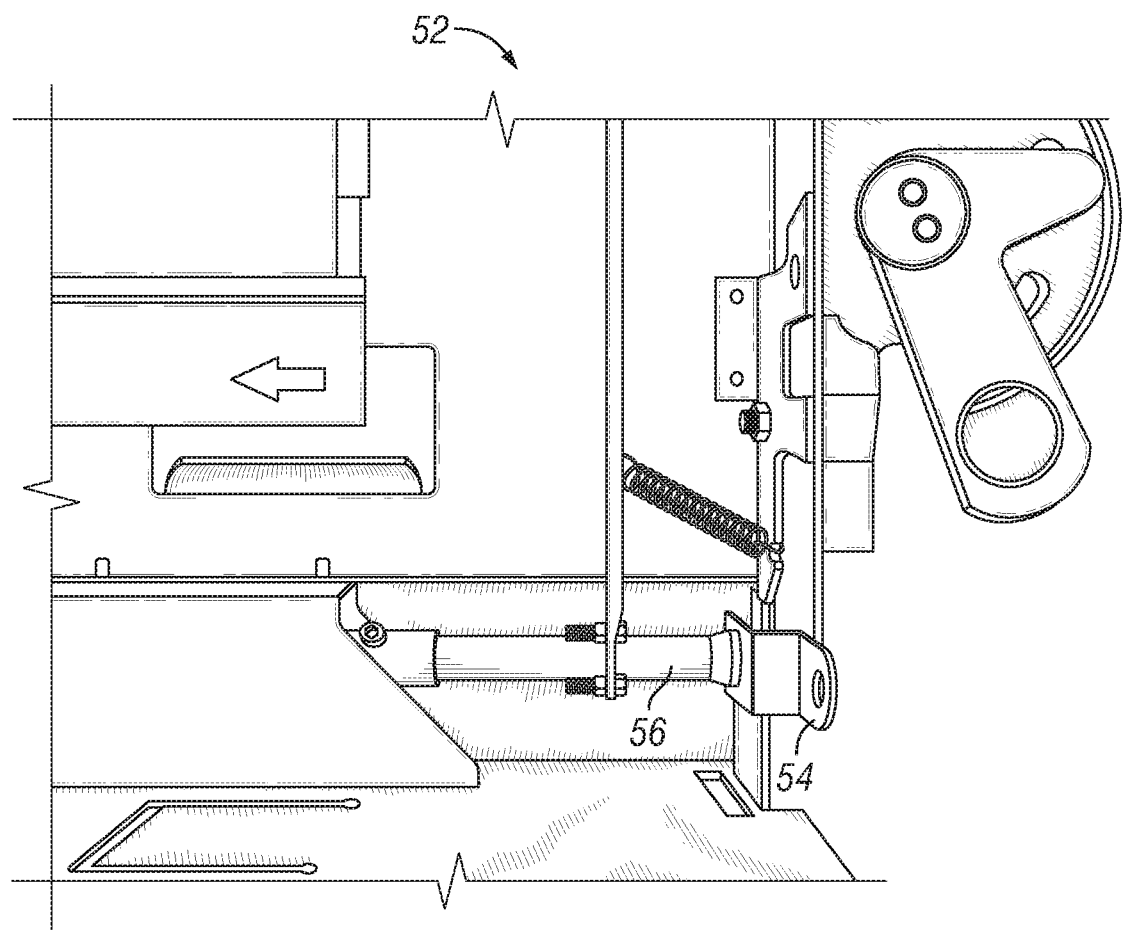
FIG. 3 is a side view from inside the circuit breaker box of FIG. 1.
Figure 4:
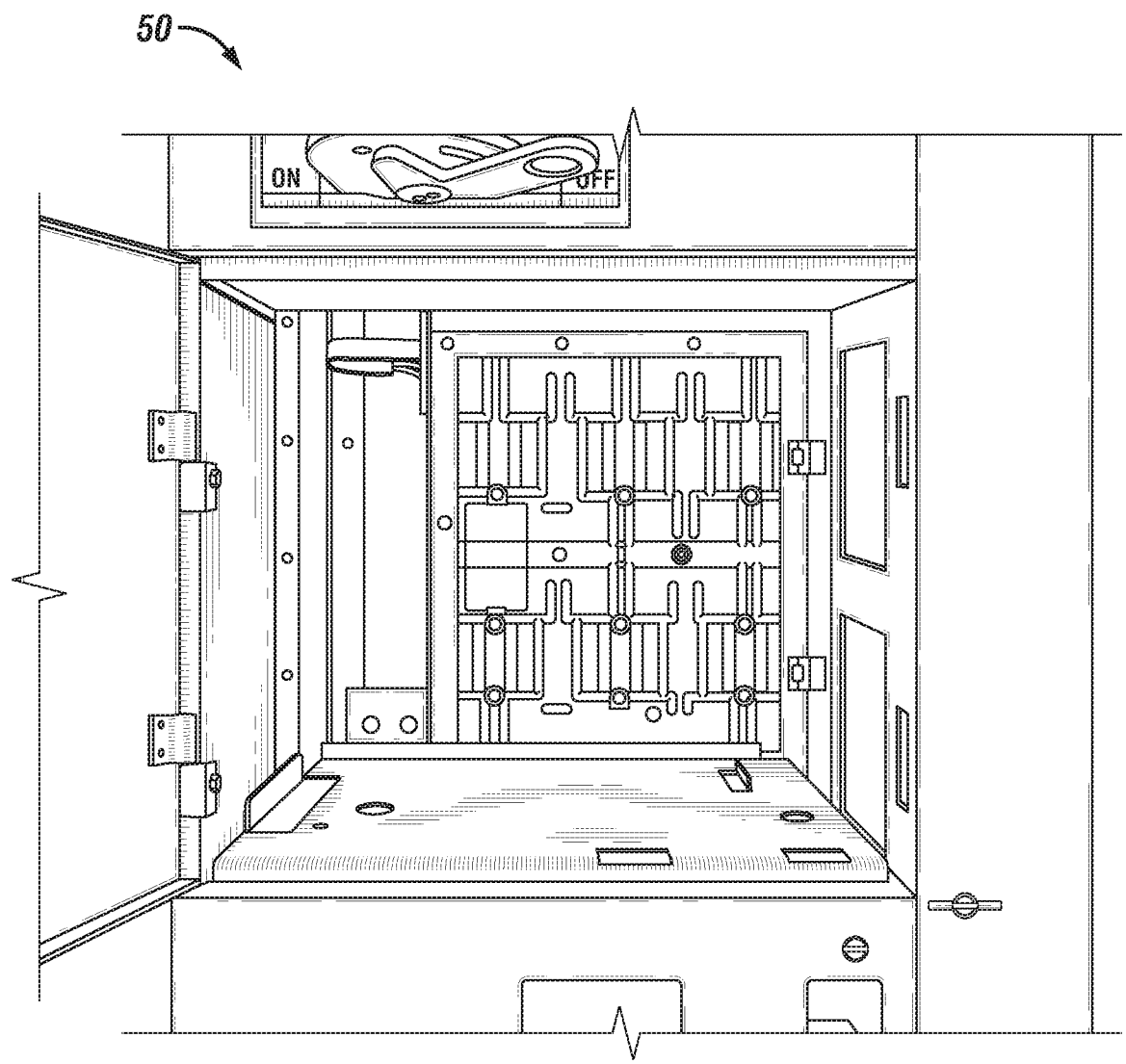
FIG. 4 is a view of the circuit breaker box of FIG. 1 with the circuit breaker removed.
Figure 5:
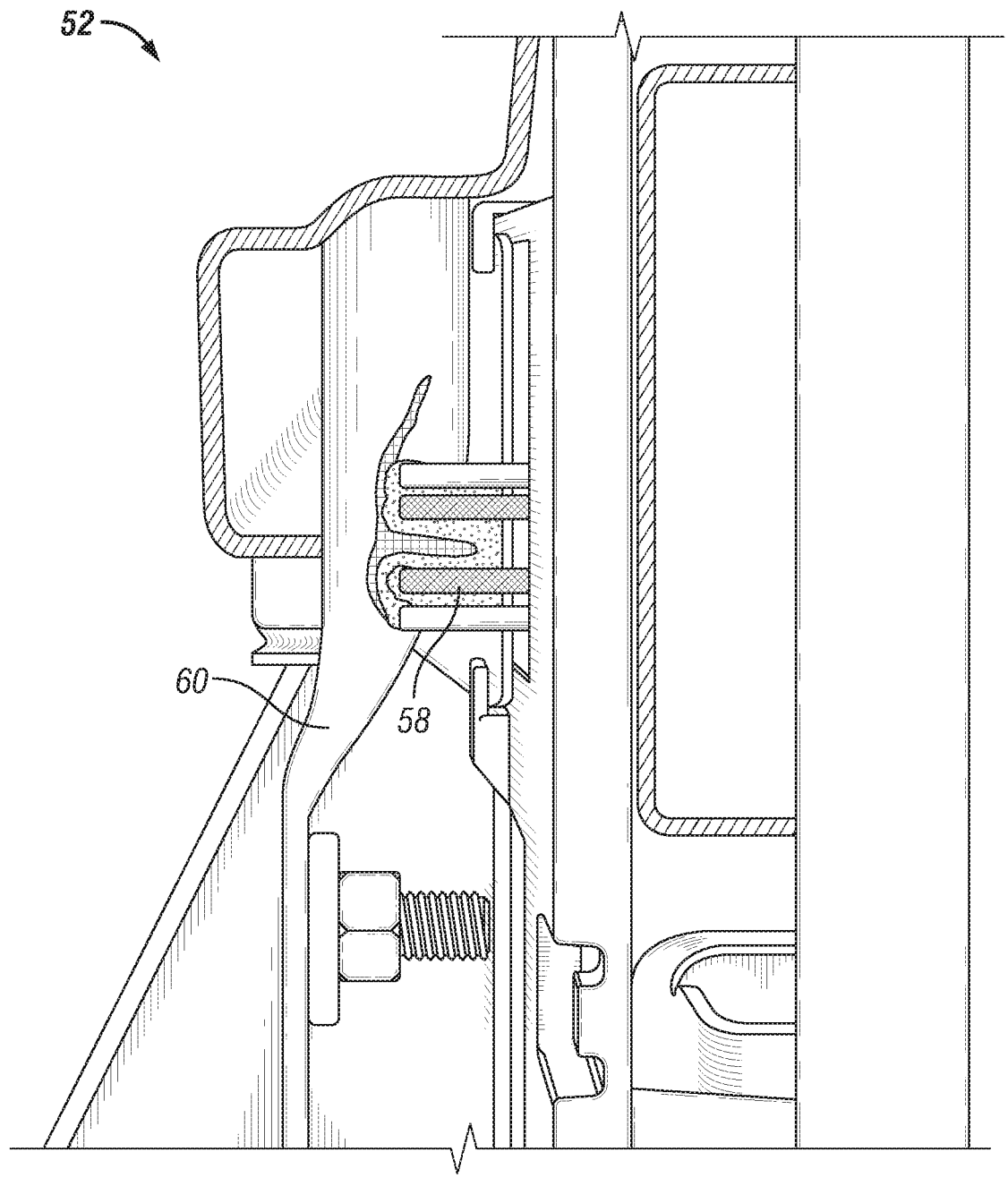
FIG. 5 is an inside side view of the circuit breaker box of FIG. 1 in which the electrical contacts of the circuit breaker are engaged with the power bus of the circuit breaker box.

With reference to FIGS. 1-7, a circuit breaker box or cabinet 50 which houses circuit breaker 52 and carries phase buses 60 (shown best in FIGS. 5-6) to which the circuit breakers 52 are to be electrically coupled is now described. Electrical coupling between the circuit breaker 52 and phase buses 60 is made via movable contacts 58 that extend outwardly from the circuit breaker 52 to contact the phase buses 60, as shown in FIG. 5.

Figure 6:
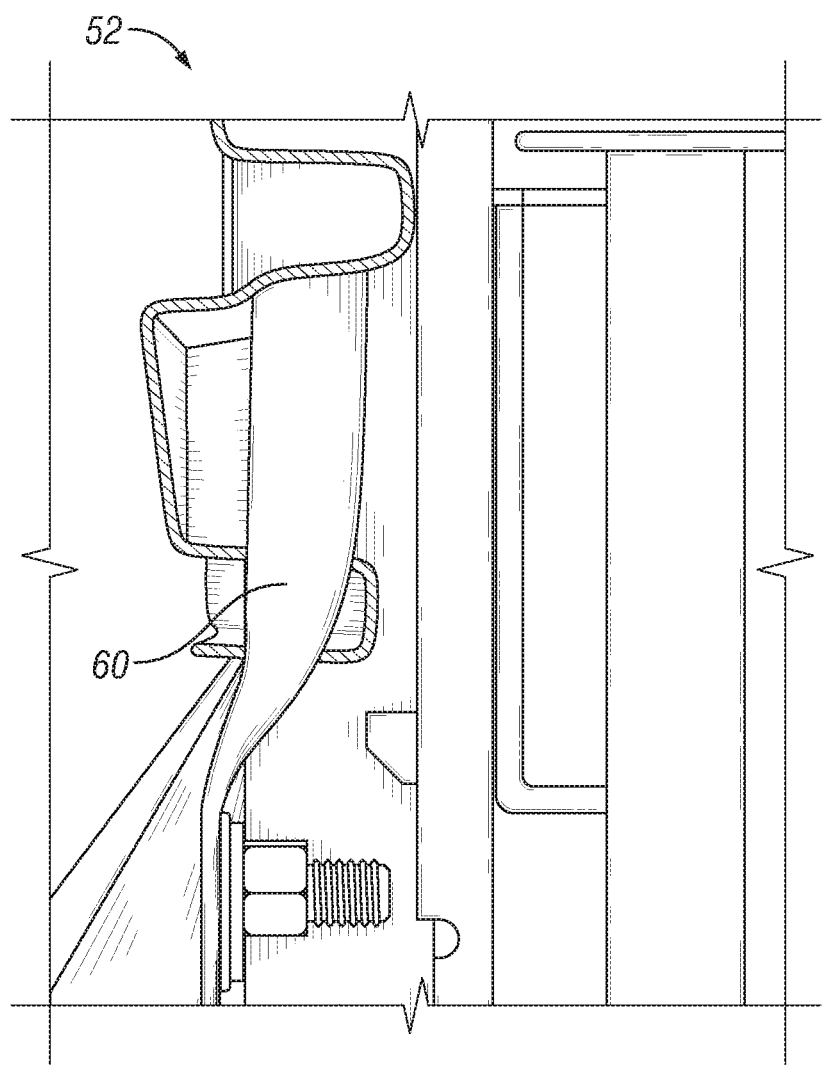
FIG. 6 is an inside side view of the circuit breaker box of FIG. 1 in which the electrical contacts of the circuit breaker are disengaged with the power bus of the circuit breaker box.
Figure 7:
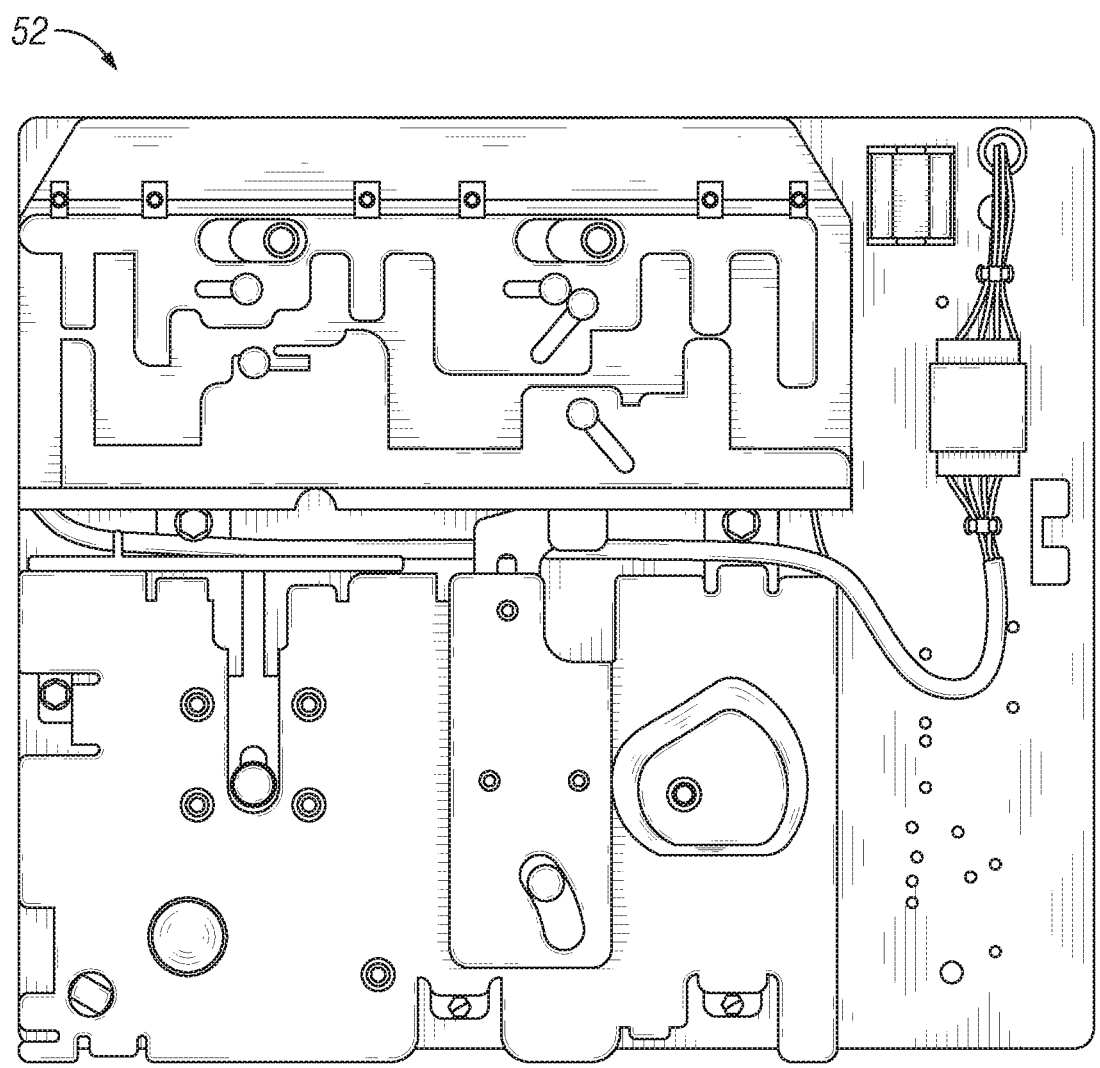
FIG. 7 is a rear view of the circuit breaker of FIG. 1.

The movable contacts 58 are rotatable 90 degrees downward, as shown in FIG. 6, so as to break the contact, and thus electrical coupling, between the circuit breaker 52 and phase buses 60. The movement of the movable contacts 58 between a fully open position or first travel limit and a fully closed position or second travel limit is accomplished mechanically by insertion of a tool into tool receptacle 54 to thereby rotate actuator 56 which moves the movable contacts 58. The tool has a polygonally or hex shaped outer surface or cross section which mates with a correspondingly shaped interior surface of the tool receptacle 54. Other males and female shaped tool interfaces may also be used.

Once the movable contacts 58 are decoupled from the phase buses 60, the circuit breaker 52 may be removed from the circuit breaker cabinet 50, as shown in FIG. 4.

Figure 8:
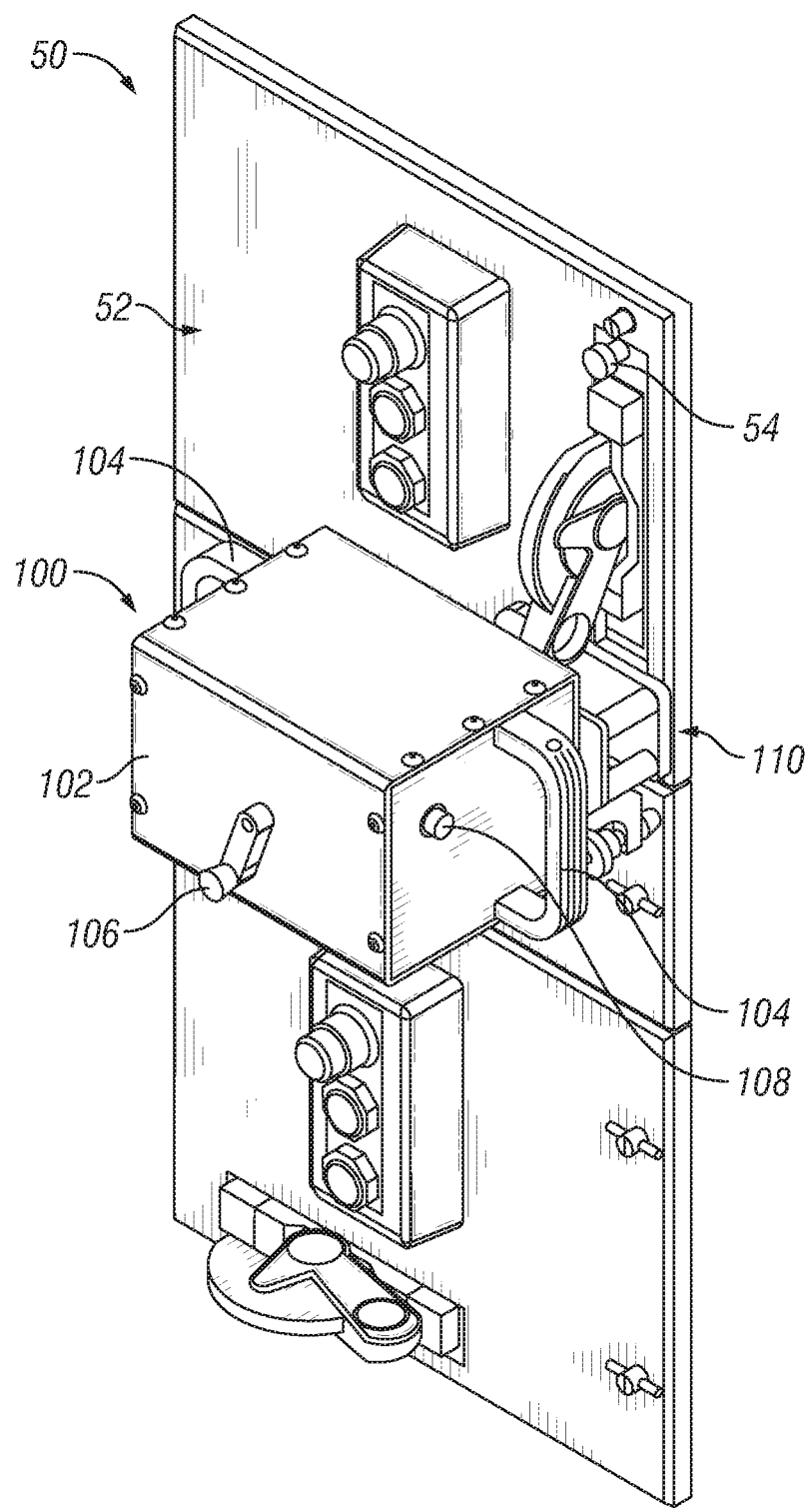
FIG. 8 is a perspective view of the drive unit disclosed herein as attached to the circuit breaker box and circuit breaker of FIG. 1.
Figure 9:
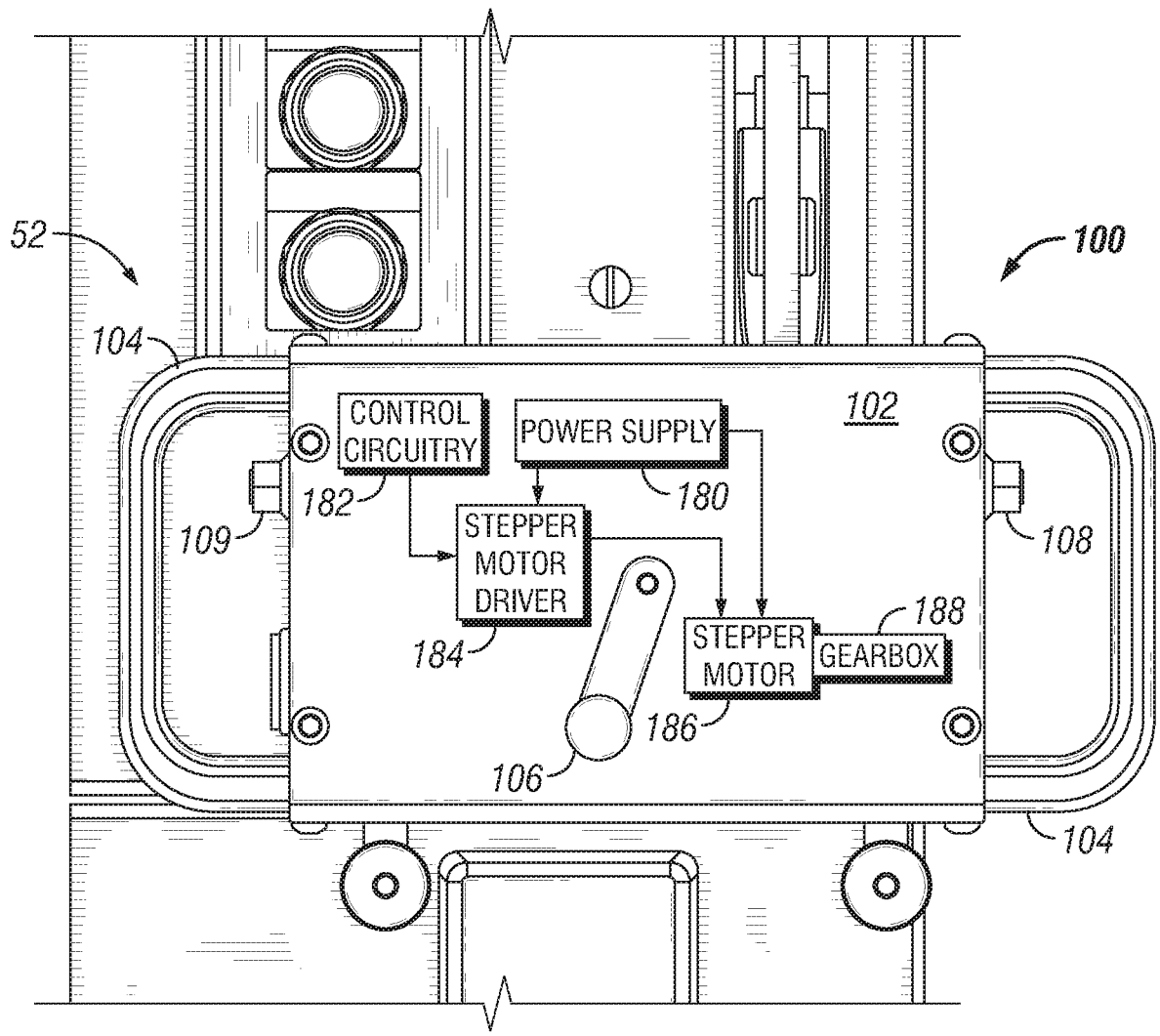
FIG. 9 is a front view of the drive unit disclosed herein as attached to the circuit breaker box and circuit breaker of FIG. 1.

So as to avoid the manual use of the tool by a technician to rotate the actuator 56, a drive unit 100, as shown in FIGS. 8-9, may be attached to the circuit breaker 52 and function to rotate the actuator 56 via insertion of its internally carried tool into the tool receptacle 54 and rotation thereof.

Figure 10:
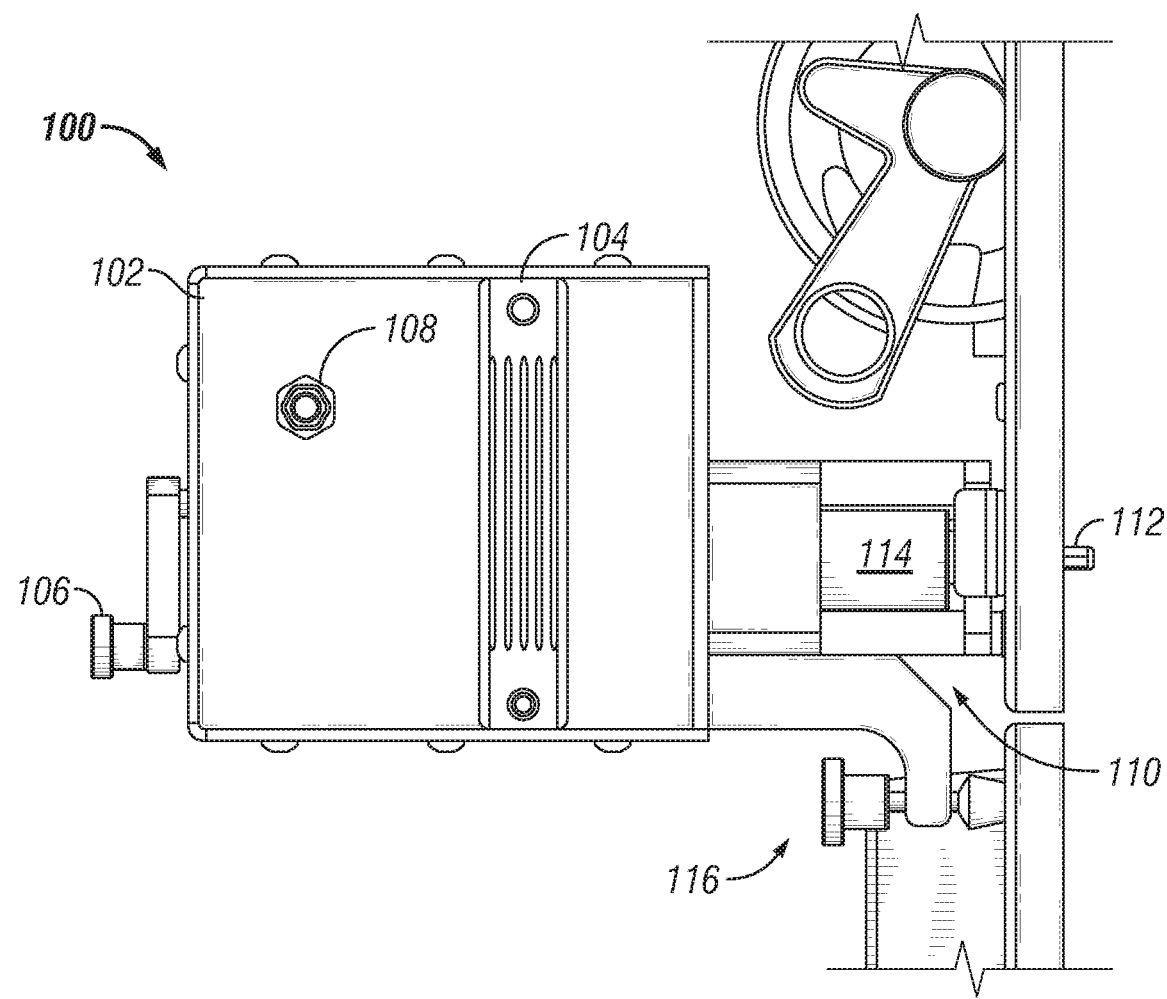
FIG. 10 is a right side view of the drive unit disclosed herein as attached to the circuit breaker box and circuit breaker of FIG. 1.
Figure 11:
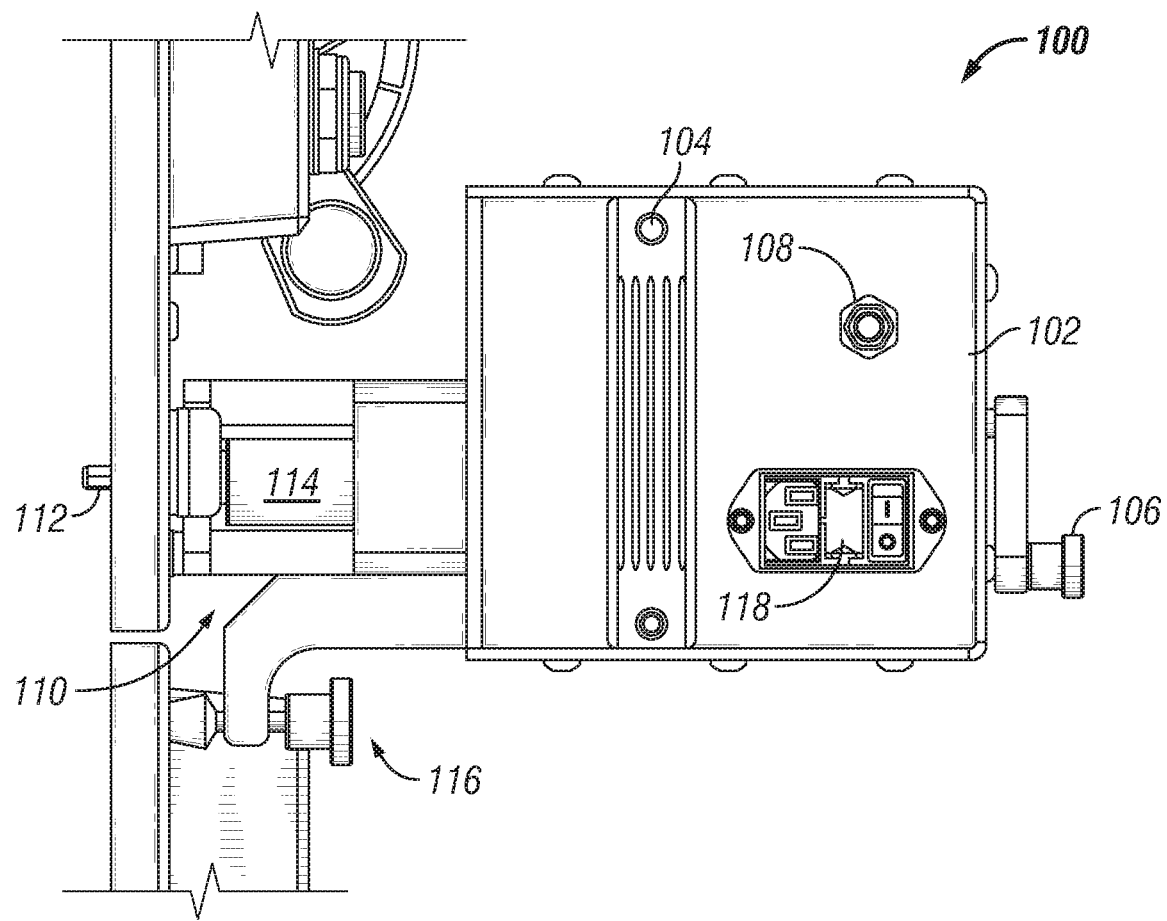
FIG. 11 is a right side view of the drive unit disclosed herein as attached to the circuit breaker box and circuit breaker of FIG. 1.

The drive unit 100 includes a housing 102 attached to the circuit breaker 52 via the attachment apparatus 110, which itself includes a plate 120 that is latched or unlatched to the cabinet 52 via crank 106. Handles 104 are coupled to the housing 102 to facilitate installation by a technician, and, as shown in FIGS. 10-11, support apparatus 116 provides additional mechanical support for the attachment of the housing 102 to the circuit breaker 52.

Figure 15:
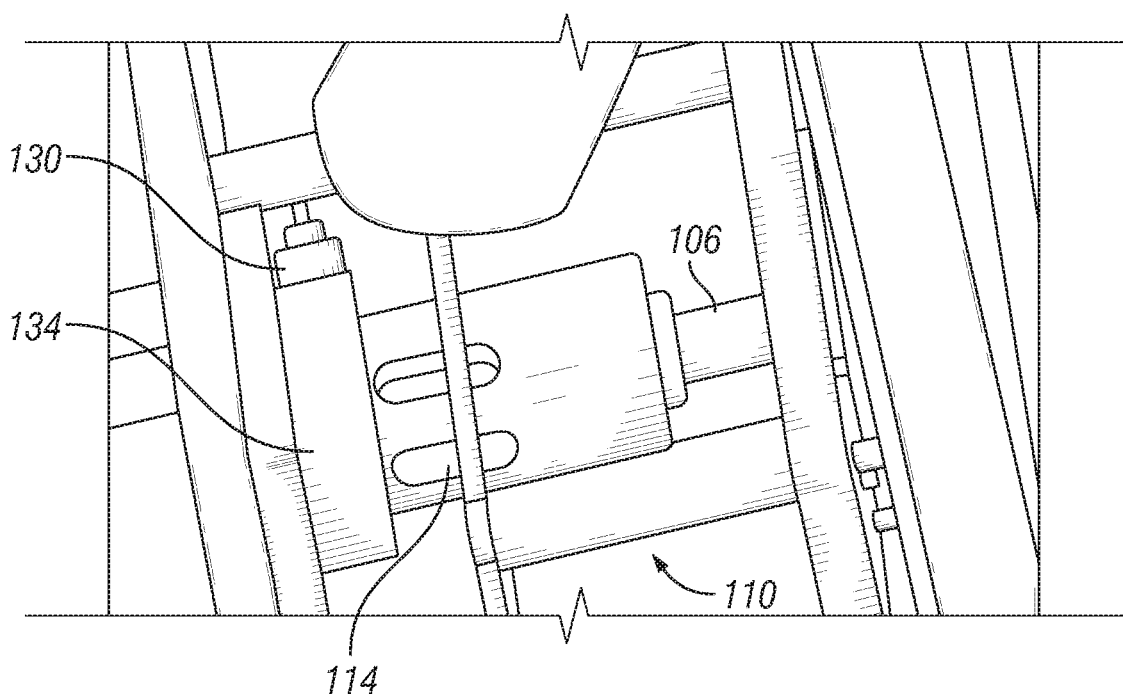
FIG. 15 is an enlarged cutaway view of the drive unit disclosed herein while operating in an engagement mode.
Figure 16:
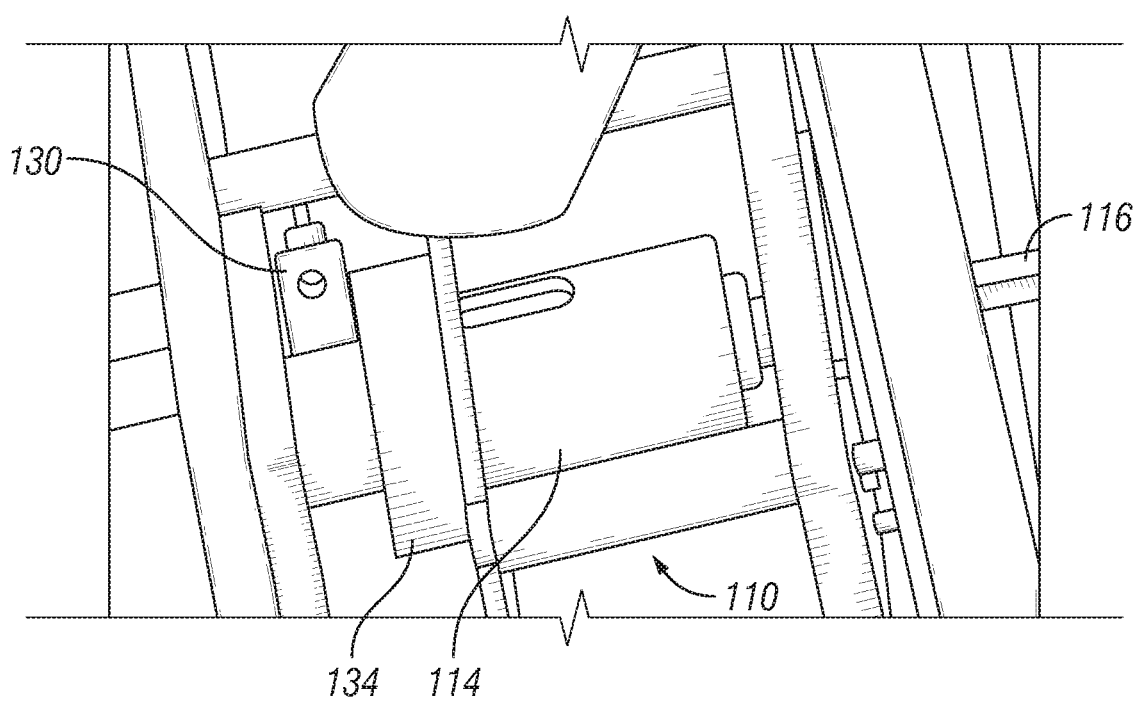
FIG. 16 is an enlarged cutaway view of the drive unit disclosed herein while operating in a device actuation mode.

A tool carrying apparatus 114 carries the internal tool 112, which is shaped and dimensioned so as to fit in and turn the tool receptacle 54. A motor apparatus 132 is mechanically coupled to rotate the tool carrying apparatus 114. The motor apparatus 132 itself is comprised of a stepper motor driver 184, which drives a stepper motor 186. A gearbox 188 couples the stepper motor 186 to the tool carrying apparatus 114. Control circuitry 182 controls the stepper motor driver 184, which in turn drives and controls the stepper motor 186. Thus, the control circuitry 182 can be said to control the stepper motor 186. A power supply 180 powers the control circuitry 182, stepper motor driver 184, and stepper motor 186. The power supply 180 receives electrical power to run from an electrical receptacle 118. A proximity detector 130 monitors axial positioning of the tool carrying apparatus 114 within the housing 102, as shown in FIGS. 15-16. The proximity detector 130 provides output to the control circuitry 182.

As explained above, insertion of the tool into the tool receptacle 54 and rotation thereof serves to engage or disengage the movable contacts 58 from the phase buses 60. However, the exact position and orientation of the tool receptacle 54 may not be consistent between cycles. Thus, if the tool 112 were to be inserted into the tool receptacle 54 in the exact same orientation during each insertion, during some of those insertions, there might be a mismatch between the orientations of the tool 112 and the tool receptacle 54. Therefore, it is desirable for the drive unit 100 to have functionality permitting detection of a mismatch between the orientation of the tool receptacle 54 and tool 112.

To that end, the tool 112 is biased toward the tool receptacle 54 upon attachment of the drive unit 100 onto the circuit breaker 52. If the tool receptacle 54 and tool 112 are aligned, the tool 112 will enter the tool receptacle 54, and therefore the tool carrying apparatus 114 will be advanced axially toward the tool receptacle 54. Where there is a misalignment, the tool 112 will be unable to enter the tool receptacle 54, and the tool carrying apparatus 114 is unable to be advanced axially toward the tool receptacle 54.

The biasing of the tool 112 toward the tool receptacle 54 may be present during installation of the drive unit 100 onto the circuit breaker 52, requiring installation against the bias. In some cases however, a bias release mechanism may be present to release the bias during installation so that the drive unit 100 may be installed onto the circuit breaker 52 without the presence of the bias, and the bias then applied thereafter. The bias may be applied using any suitable form of spring, for example.

The proximity detector 130 detects whether the tool carrying apparatus 114 has moved a threshold distance along its longitudinal axis toward the tool receptacle 54 by detecting presence of a raised shoulder 134 of the tool carrying apparatus 114. If proximity of the raised shoulder 134 is detected, such as in the scenario shown in FIG. 15, then the tool carrying apparatus 114 has not moved the threshold distance along its longitudinal axis toward the tool receptacle 54, and it can be inferred that the tool receptacle 54 and tool 112 are not aligned. As a corollary, if proximity of the raised shoulder 134 is not detected, such as shown in the scenario of FIG. 16, then the tool carrying apparatus 114 has moved the threshold distance along its longitudinal axis toward the tool receptacle 54, and it can be inferred that the tool receptacle 54 and tool 112 are aligned.

Where misalignment is detected via the proximity sensor 130, the control circuitry 182 controls the motor apparatus 132 in an engagement mode in which it is slowly rotated, such 1 to 30 degrees, until sufficient movement of the tool carrying apparatus 114 is detected and thus alignment is determined.

Once alignment is reached, or where alignment is detected, then the control circuitry 182 controls the motor apparatus 132 in a device actuation mode in which it is more quickly rotated until the tool receptacle 54 is completely moved from a first travel limit to a second travel limit, to thereby either engage or disengage the movable contacts 58 from the phase buses 60.

Detection of the tool receptacle 54 being at the first or second travel limit may be made by monitoring power drawn by the motor apparatus 132. For example, a power draw above a given threshold may indicate that the tool receptacle 54 is at the first or second travel limit.

In other cases, detection of the tool receptacle 54 being at the first or second travel limit may be made by monitoring the status of the movable contacts 58. For example, where the motor apparatus 132 rotates the tool receptacle 54 from a first travel limit at which the movable contacts 58 are disengaged with the power buses 60 to a second travel limit at which the movable contacts 58 are engaged with the power buses 60, the tool receptacle 54 being at the second travel limit may be determined by detection of electrical contact between the movable contacts 58 and the power buses 60. Where the motor apparatus 132 rotates the tool receptacle 54 from a second travel limit at which the movable contacts 58 are engaged with the power buses 60 to a first travel limit at which the movable contacts 58 are disengaged with the power buses 60, the tool receptacle 54 being at the first travel limit may be determined by initial detection of a break in electrical contact between the movable contacts 58 and the power buses 60, and then a given known delay period passing after the break in the electrical contact. In some cases, combinations of the techniques for determining presence at the travel limits may be used.

These detections of electrical contact may be accomplished by monitoring a sensor or connector within the circuit breaker 52 or cabinet 50. The output of this sensor may be fed via 4-pin connector 54 on the cabinet 50 to 4-pin connector 108 on the housing 102 of the drive unit 100. Any suitable connectors may be used.

Figure 17:
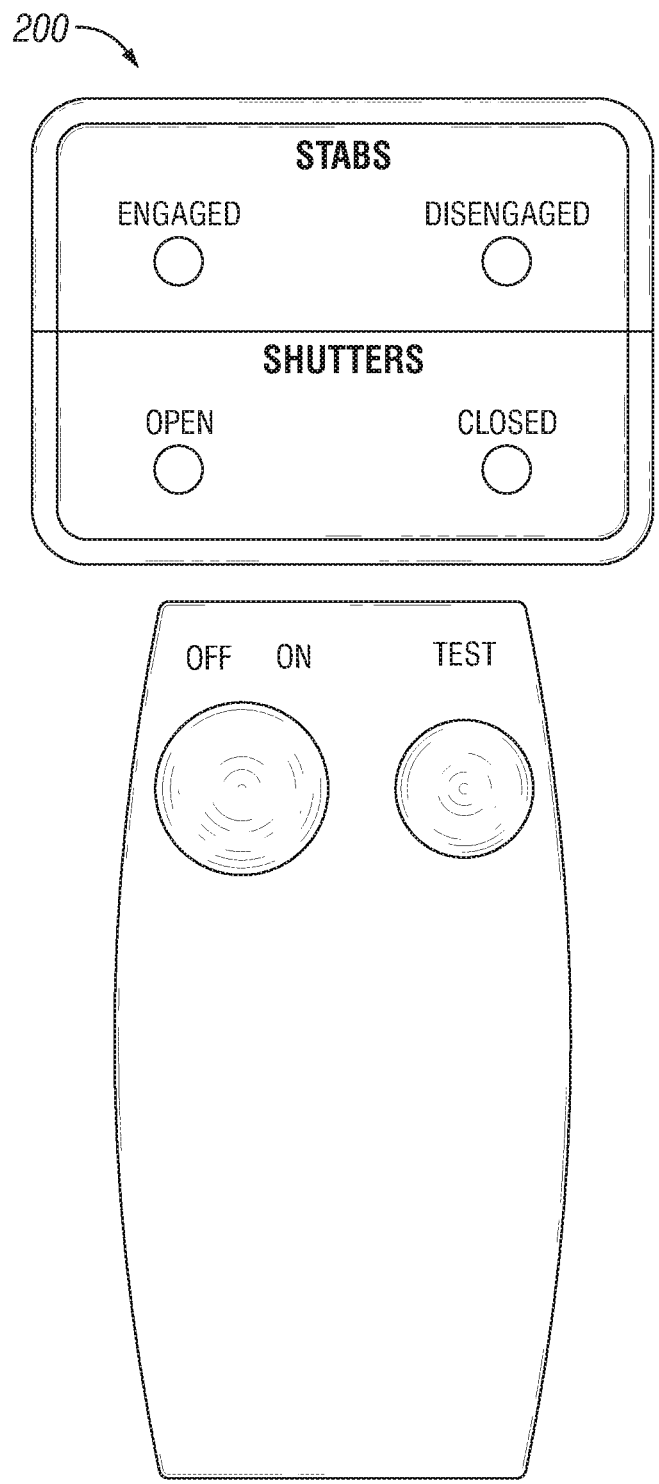
FIG. 17 is a front view of a tester for use with the drive unit and/or circuit breaker.
Figure 18:
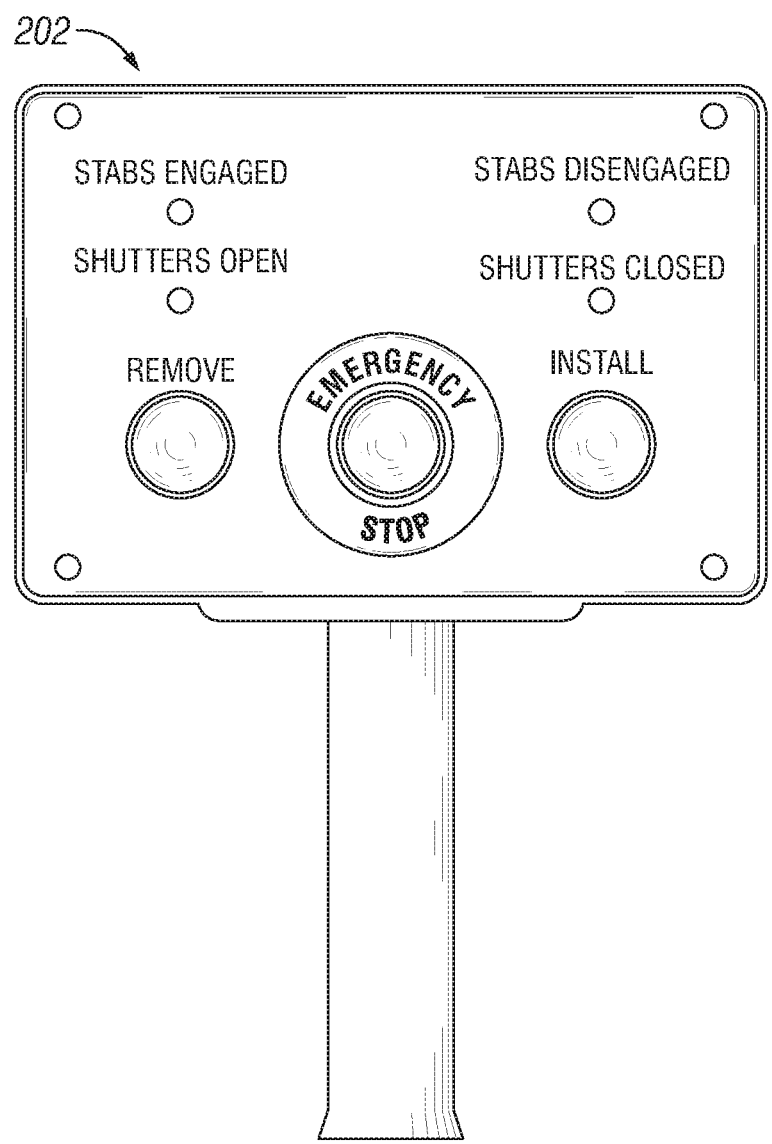
FIG. 18 is a front view of a control box for use with the drive unit and/or circuit breaker.
Figure 19:
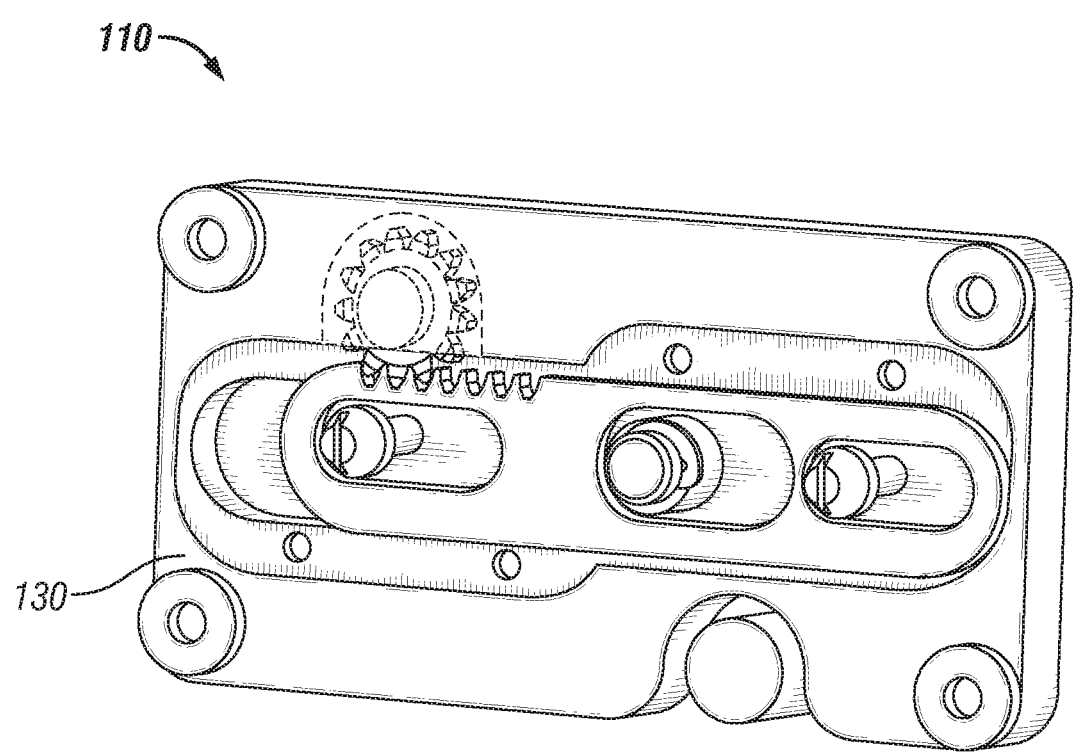
FIG. 19 is a rear view of the attachment apparatus of the drive unit disclosed herein.

A tester 200, shown in FIG. 17, may be coupled to the connector 109 on the housing 102 of the drive unit 100 to test the current condition of the circuit breaker 52 without actuating the drive unit 100. In addition, a control box 202, as shown in FIG. 17, may be used to direct the control circuitry 182, so as to prepare the circuit breaker 52 for installation or removal.

Figure 12:
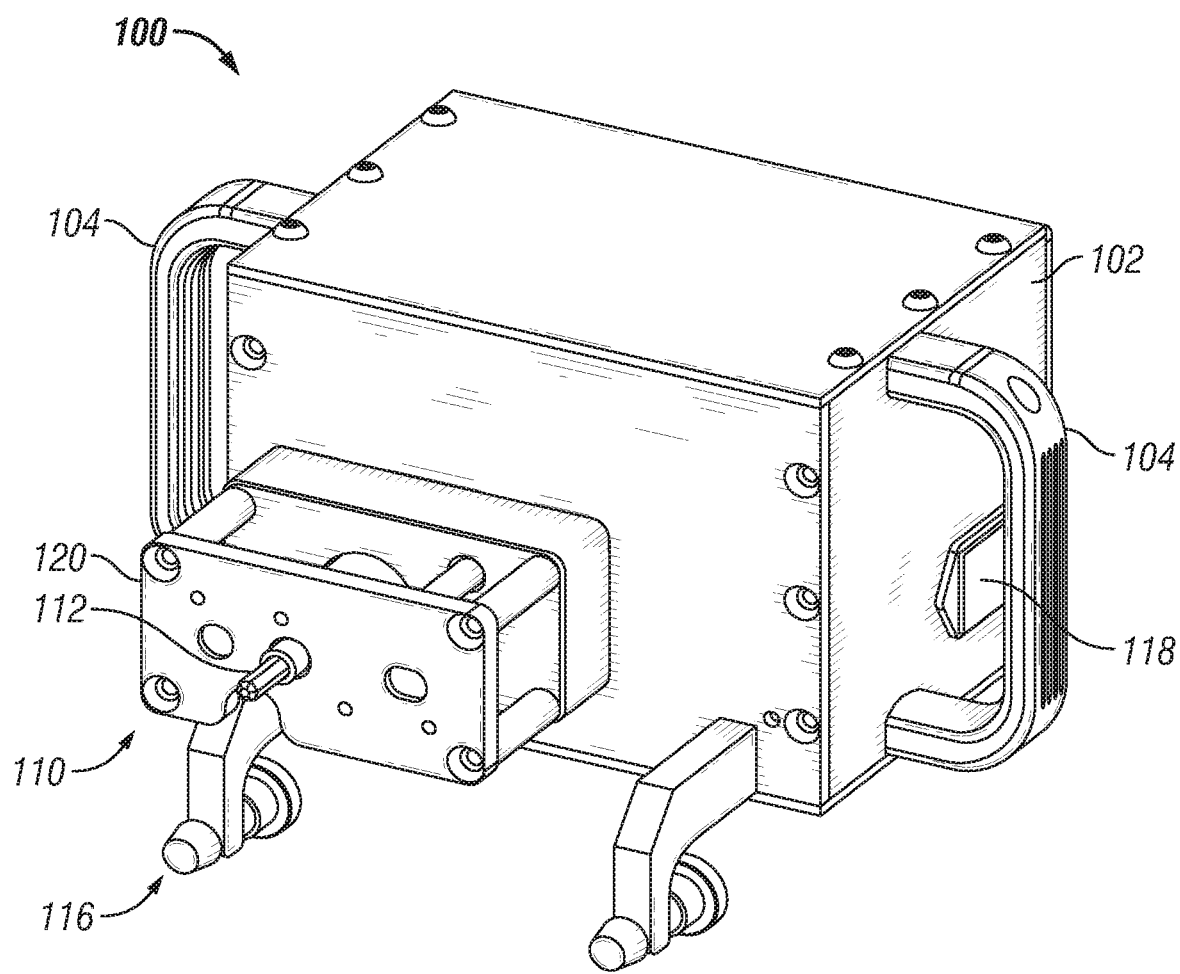
FIG. 12 is a rear view of the drive unit disclosed herein.
Figure 13:
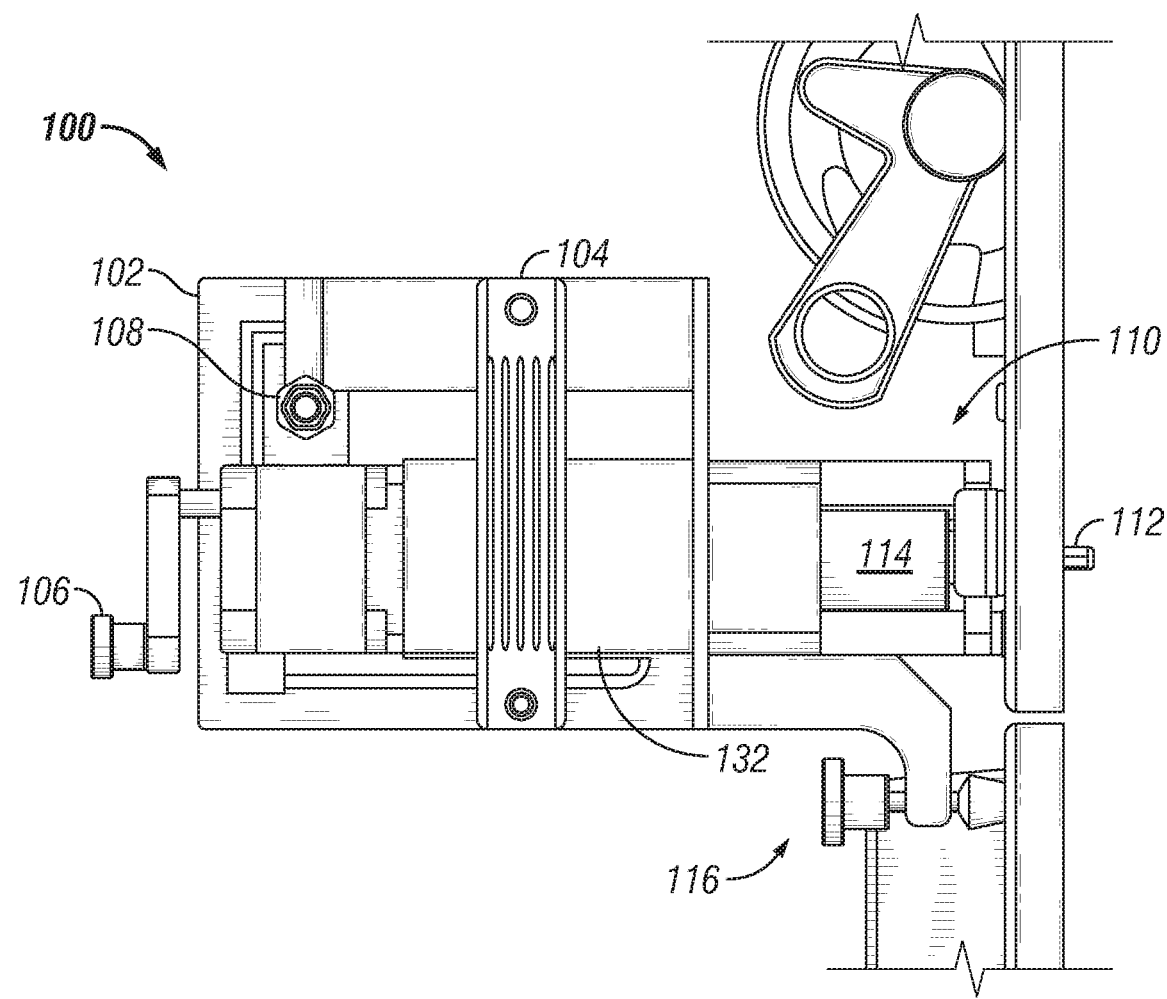
FIG. 13 is a right side cutaway view of the drive unit disclosed herein as attached to the circuit breaker box and circuit breaker of FIG. 1.
Figure 14:
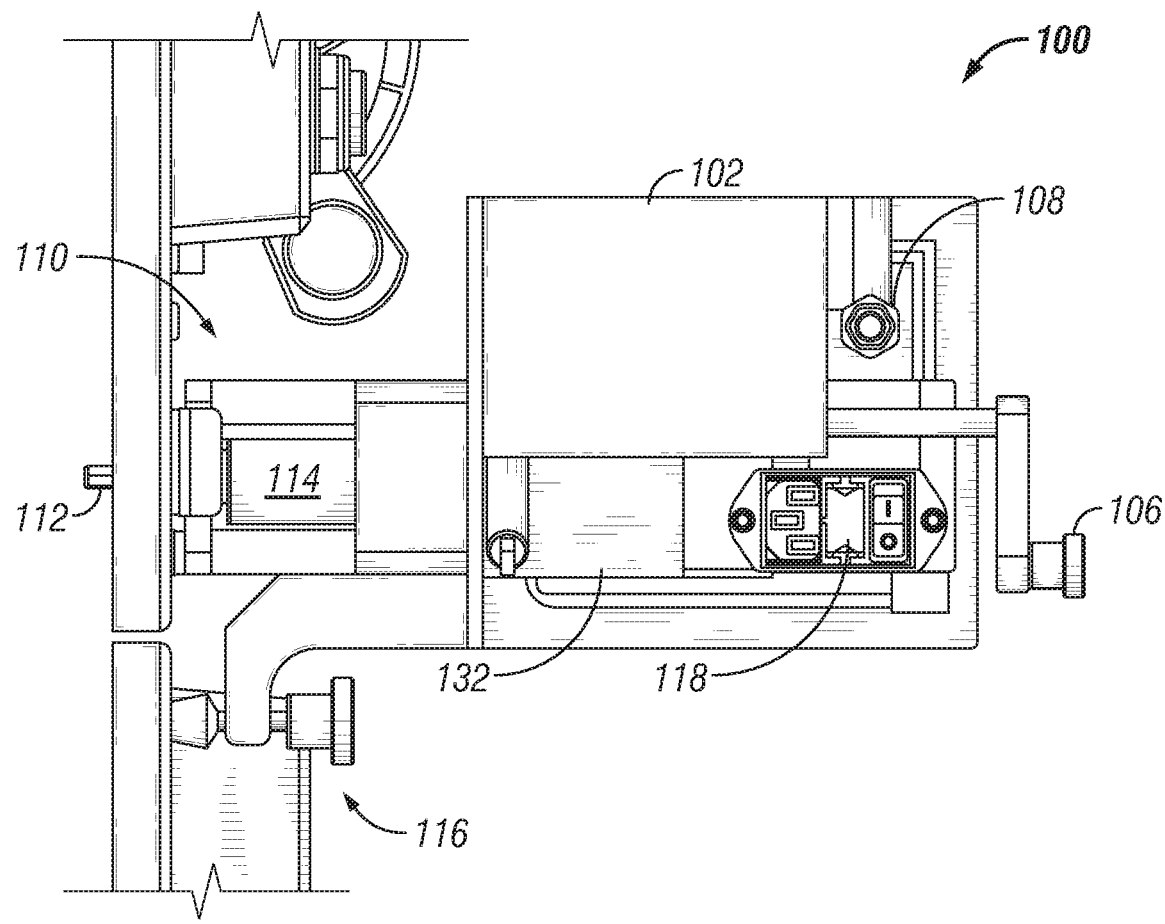
FIG. 14 is a left side cutaway view of the drive unit disclosed herein as attached to the circuit breaker box and circuit breaker of FIG. 1.

A rear view of the attachment apparatus 110 is shown in FIG. 12. Here, it is shown that the plate 120 slides back and forth to latch onto the cabinet 50 using a rack and pinion gear arrangement.

Many modifications and other embodiments will come to the mind of one skilled in the art having the benefit of the teachings presented in the foregoing descriptions and the associated drawings. Therefore, it is understood that various modifications and embodiments are intended to be included within the scope of the appended claims.

The invention claimed is:

1. A drive unit for driving a tool mated with a tool receptacle in a device, the drive unit comprising:
   a tool carrying apparatus configured to carry the tool;
   a proximity sensor cooperating with at least a portion of the tool carrying apparatus so as to detect movement of the tool carrying apparatus along a longitudinal axis thereof;
   a motor apparatus configured to rotate the tool carrying apparatus;
   control circuitry configured to operate the motor in an engagement mode to rotate at least a portion of the tool carrying apparatus until the tool is rotationally aligned with the tool receptacle so as to permit insertion thereinto, based on the proximity sensor not detecting movement of the tool carrying apparatus a threshold distance along the longitudinal axis toward the tool receptacle;
   the device comprising:
   a breaker device having movable contacts movable between first and second travel limits, wherein rotation of the tool receptacle in a first direction moves the movable contacts of the breaker device toward the first travel limit so as to selectively engage with a power bus so as to actuate the device.

2. The drive unit of claim 1, wherein the tool has a polygonally shaped cross section and exterior surface; wherein the tool receptacle in the device has a polygonally shaped interior surface dimensions to engage with the tool when inserted therein; and wherein the control circuitry operates the motor to rotate at least the portion of the tool carrying apparatus until the polygonally shaped exterior surface of the tool is aligned with the polygonally shaped interior surface of the tool receptacle so as to permit insertion of the tool into the tool receptacle.

3. The drive unit of claim 1, further comprising a biasing member engaging with the tool carrying apparatus and configured to bias the tool carrying apparatus toward the tool receptacle.

4. The drive unit of claim 3, further comprising disengagement apparatus configured to selectively disengage the biasing member from the tool carrying apparatus.

5. The drive unit of claim 1, wherein the control circuitry operates the motor to rotate at least the portion of the tool carrying apparatus until the tool is rotationally aligned with the tool receptacle so as to permit insertion thereinto, as the tool is biased toward the tool receptacle.

6. The drive unit of claim 1, wherein the proximity sensor detects movement of the tool carrying apparatus along the longitudinal axis thereof as the tool is biased toward the tool receptacle.

7. The drive unit of claim 1, wherein the proximity sensor not detecting movement of the tool carrying apparatus the threshold distance along the longitudinal axis indicates that the tool is not rotationally aligned with the tool receptacle.

8. The drive unit of claim 1, wherein the control circuitry operates the motor in the engagement mode in response to user input received via an input circuit.

9. The drive unit of claim 1, wherein the control circuitry is configured to operate the motor in a device actuation mode to rotate at least the portion of the tool carrying apparatus until the device is actuated or de-actuated.

10. The drive unit of claim 9, wherein the control circuitry operates the motor in the device actuation mode based on the proximity sensor detecting movement of the tool carrying apparatus the threshold distance along the longitudinal axis toward the tool receptacle.

11. The drive unit of claim 9, wherein the portion of the tool carrying apparatus is rotated a greater rotational distance in the device actuation mode than in the engagement mode.

12. The drive unit of claim 1, wherein rotation of the tool receptacle in the second direction moves the movable contacts of the breaker device toward the second travel limit so as to selectively disengage with the power bus so as to de-actuate the device.

13. The drive unit of claim 12, wherein the device further comprises a sensor to determine whether the movable contacts of the breaker device are engaged with the power bus; wherein the control circuitry is configured to operate the motor in the first direction in a tool engagement move until the movable contacts reach the first travel limit, based upon the sensor indicating engagement of the movable contacts with the power bus; and wherein the control circuitry is configured to operate the motor in the second direction in the tool engagement mode until the movable contacts reach the second travel limit, based upon the sensor indicating disengagement of the movable contacts from the power bus.

14. The drive unit of claim 13, wherein the control circuitry operates the motor in the second direction for a given period of time after the sensor indicates disengagement of the movable contacts from the power bus.

15. A method of actuating a device actuatable via a tool receptacle, the method comprising:
   attaching the drive unit of claim 1 to the device;
   detecting whether a tool carrying apparatus within the drive unit has moved at least a threshold distance along its longitudinal axis toward the tool receptacle, using a proximity sensor, wherein the tool carrying apparatus carries a tool sized to fit within the tool receptacle;
   operating a motor apparatus within the drive unit in an engagement mode to rotate at least a portion of the tool carrying apparatus until the tool is rotationally aligned with the tool receptacle so as to permit insertion thereinto, based on the proximity sensor not detecting movement of the tool carrying apparatus at least the threshold distance along the longitudinal axis toward the tool receptacle; and
   operating the motor apparatus in a device actuation mode to rotate at least the portion of the tool carrying apparatus until the device is actuated or de-actuated, while the tool is inserted into the tool receptacle, based on the proximity sensor detecting movement of the tool carrying apparatus the threshold distance along the longitudinal axis toward the tool receptacle.

* * * * *